(12) United States Patent
Zimmer

(10) Patent No.: US 6,349,447 B1
(45) Date of Patent: *Feb. 26, 2002

(54) WIPER BLADE

(75) Inventor: Joachim Zimmer, Sasbach (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/355,658

(22) PCT Filed: Nov. 20, 1998

(86) PCT No.: PCT/DE98/03435

§ 371 Date: Oct. 4, 1999

§ 102(e) Date: Oct. 4, 1999

(87) PCT Pub. No.: WO99/29545

PCT Pub. Date: Jun. 17, 1999

(30) Foreign Application Priority Data

Dec. 4, 1997 (DE) .......................... 197 53 761

(51) Int. Cl.$^7$ .................................................. B60S 1/38
(52) U.S. Cl. .................. 15/250.201; 264/255; 264/318; 29/897.2
(58) Field of Search ............. 15/250.201, 250.361, 15/250.41, 250.4, 250.43, 250.44; 29/897.2; 264/255, 274, 294, 296, 273, 267, 318

(56) References Cited

U.S. PATENT DOCUMENTS

| 4,590,638 A | * | 5/1986 | Beneteau | ............... | 15/250.201 |
| 5,086,534 A | * | 2/1992 | Journee | .................. | 15/250.201 |
| 5,160,474 A | * | 11/1992 | Huff | ........................... | 264/255 |

FOREIGN PATENT DOCUMENTS

| DE | 34 34 601 A1 | 4/1985 | |
| DE | 195 28 015 C1 | 10/1996 | |
| EP | 565437 | * 10/1993 | ............ 15/250.201 |
| EP | 0 765 783 A1 | 4/1997 | |
| FR | 1 237 303 | 6/1960 | |
| FR | 2 373 426 | 12/1976 | |
| FR | 2 642 714 | 8/1990 | |
| FR | 2 642 715 | 8/1990 | |

\* cited by examiner

Primary Examiner—Gary K. Graham
(74) Attorney, Agent, or Firm—Michael J. Striker

(57) ABSTRACT

The wiper blade (10) for a windshield has a wind scoop (20, 22, 24) elastically fastened to it. The wiper blade (10) includes a rubber wiping element (16), which is adapted to contact the windshield (12) with its wiper lip (18). The wind scoop (20, 22, 24) includes a rigid component and an elastic lip arranged close to the windshield (12) during an upward wiping motion. The elasticity and lever arm of the elastic lip are selected so that it moves closer to the windshield during a downward wiping motion and, when opposing forces due to wiper lip friction and wind exceed a predetermined limiting value, it contacts the windshield (12) during the downward wiping motion. The edge region of the elastic lip that contacts the windshield is provided with steps, zigzags and/or waves, so that friction forces between the elastic lip and windshield are reduced.

4 Claims, 6 Drawing Sheets

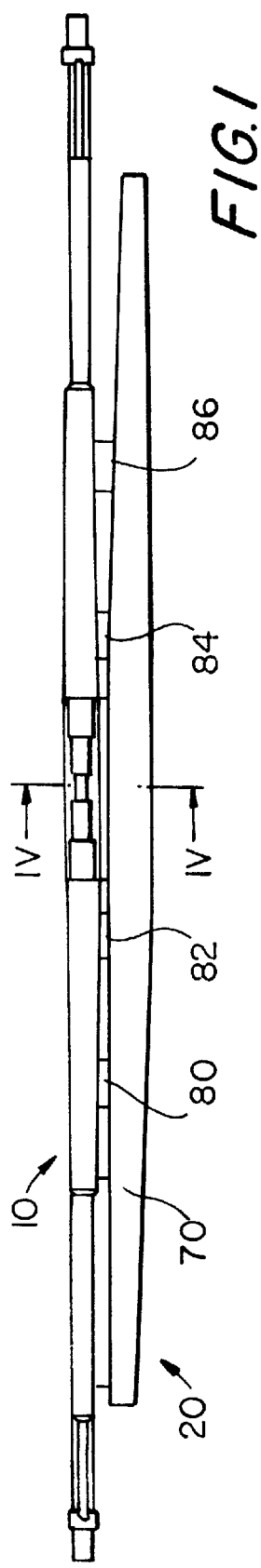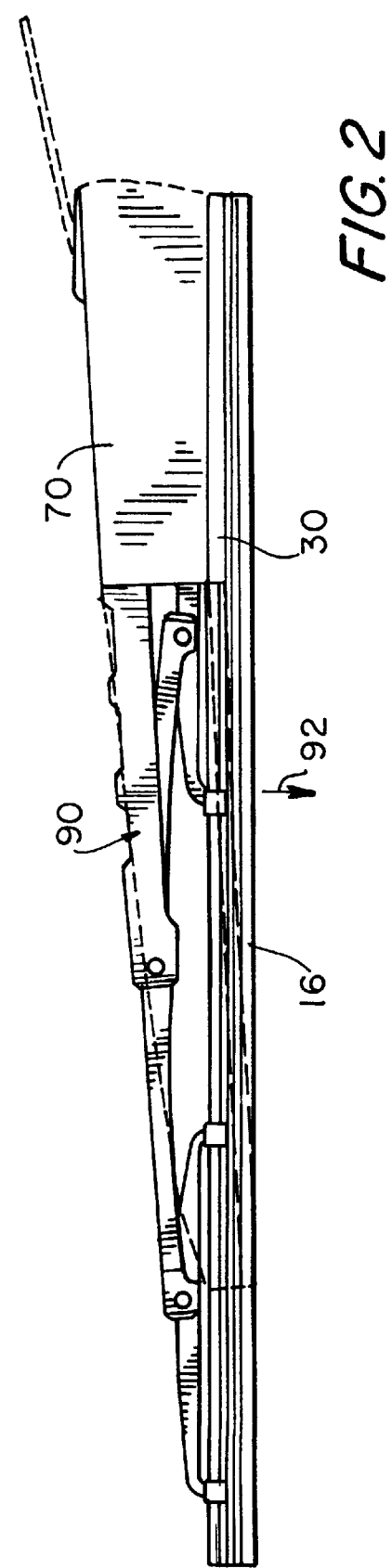

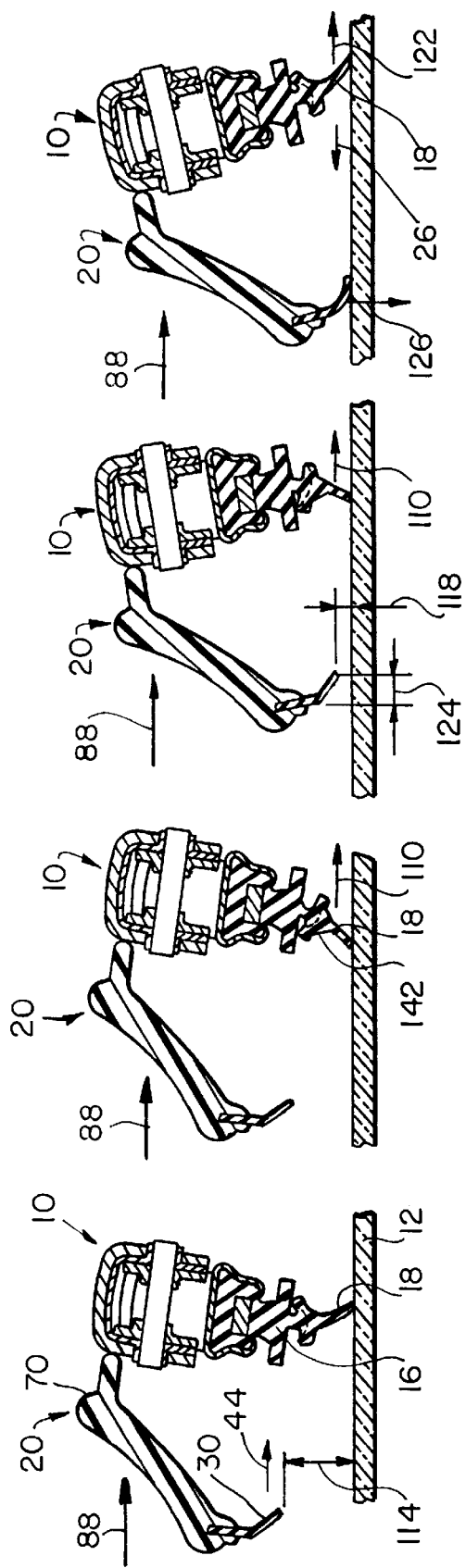

WIPER BLADE

BACKGROUND OF THE INVENTION

FIELD OF THE INVENTION

The present invention relates to a wiper blade with a wind scoop elastically supported on the wiper blade in front of it, the wiper blade being adapted to rest with its wiper lip on a windshield of a motor vehicle and the wind scoop comprising an elastic lip arranged in close proximity to the windshield so as to contact the windshield during a downward motion of the wiper blade on the windshield.

Known windshield wipers have a wiper arm, which is comprised of a fastening part attached to a drive axle, a pivoting part connected to it an elbow joint, and a wiper rod that is rigidly connected to the pivoting part. Furthermore, the windshield wiper has a wiper blade which has a support bracket system and a rubber wiper element supported by this bracket system. The wiper blade is coupled to the wiper arm by virtue of the fact that a hook-shaped end of the wiper rod engages between two side walls of the support bracket system and encloses a hinge bolt. The joint thus formed guides the wiper blade with the rubber wiper element over a motor vehicle window, wherein the pivoting part and the support bracket system make it possible for the rubber wiper element to adapt to a curvature of the motor vehicle window. A required pressure of the rubber wiper element against the vehicle window is produced with at least one tension spring, which secures the fastening part and the pivoting part together with the wiper rod by way of the elbow joint.

The rubber wiper element is comprised of an elastomer. It has a top strip which is connected by way of an intermediary tilting piece to a wiper lip that rests against the window to be wiped. By means of the intermediary tilting piece, the wiper lip can turn over into the opposite direction at the reversal point of the wiping motion so that it always assumes a favorable angle to the windshield. When the windshield wiper is actuated, the rubber wiper element slides together with the wiper lip over the vehicle window. When the vehicle is being driven, a driving wind flows underneath the wiper arm and the wiper blade and generates a force counter to the pressing force of the tension spring. Particularly at high speeds, the pressing force of the wiper blade against the windshield can be reduced by the driving wind to the point that the wiper blade lifts up from the windshield or floats on a water film, or that the wiper lip of the rubber wiper element is blown around. This leads to the fact that the wiper blade rattles against the windshield and the cleaning quality is insufficient.

It is known to fasten a wind scoop on the driver's side, in front of the wiper blade in the downward wiping direction, which conveys the driving wind over the wiper blade and thereby presses the wiper blade against the vehicle window. In order to prevent the driving wind from flowing underneath the wind scoop and thereby producing wind noise and reducing the pressing force, the wind scoop should be disposed with a lower edge as close as possible to the windshield. The inclination of the wiper blade and therefore the distance of the wind scoop from the windshield, however, is a function of many influence quantities which change over time and have reciprocal relationships to one another.

The wiper arm and wiper blade are comprised of a number of individual components, a number of which are connected to one another by way of hinged joints. With increasing hours of operation of the wiper blade and wiper arm, the play between the components increases and the torsional and flectional resistance moments of the individual components decreases.

In addition, friction forces and normal forces act on the wiper arm and wiper blade, and driving forces and wind forces act between the wiper lip and the windshield. Depending on the wiping direction, the friction force is directed counter to this wiping direction and depends on the state of the rubber wiper element, the weather conditions, the wiping speed, and the direction and intensity of the wind forces, which are produced by the driving wind and by cross-winds and have an effect on the normal force and friction force between the windshield and the wiper blade. Furthermore, the curvature of the windshield and thereby the inclination in relation to the wiper blade differs depending on the position of the wiper blade.

The smaller the distance of the wind scoop from the windshield, the better the driving wind is conveyed over the wiper blade, but this also means that with different influence quantities that have an impact on one another, the wind scoop comes into contact with the windshield more easily.

DE 195 28 015 C1 has disclosed a wind scoop to which an elastic wind deflection element is fastened which is disposed approximately parallel to the wiper lip close to the windshield and is elastically supported or can be deformed so that influenced by the driving wind at higher driving speeds of the vehicle, this wind deflection element contacts the windshield in at least one wiping region. If the elastic wind deflection element comes into contact with the windshield, an impact noise is thereby produced, the pressing force of the wiper lip against the windshield is abruptly reduced, which can lead to the fact that the wiper blade begins to rattle and the wiper lip floats on the surface. Furthermore, with certain influence quantities such as drizzle, the wind deflection element can be induced to execute vibrations that are transmitted to the wiper blade and cause it to rattle.

SUMMARY OF THE INVENTION

It is an object of the present invention to provide an improved wiper blade and wind scoop of the above-described type for cleaning a windshield of a motor vehicle, which does not have the above-described disadvantages.

According to the invention, a wind scoop is fastened to a wiper blade or wiper arm and is disposed in front of the wiper blade in the downward wiping direction. The wind scoop has an elastically soft lip that points toward the windshield and is inclined toward the wiper lip. The wind scoop is disposed with the elastically soft lip particularly close above the windshield, but far enough away that normally and in particular with the upward wiping motion, the lip is always guided closely above the windshield. With a downward wiping motion in the direction of the wind scoop, the wiper blade and the wiper arm with the wind scoop are rotated toward the windshield, by means of which the distance decreases between the wind scoop or the lip and the windshield. If different influence quantities also occur during the downward wiping motion, e.g. a strong driving wind, high friction forces, a rapid wiping speed, etc., so that the wind scoop meets the windshield with the elastically soft lip, the lip is deflected in the direction of the wiper lip and elastically compensates for or cushions the movement energy of the wind scoop and the wiper blade by means of a rolling motion. The further the lip is deflected in the direction of the wiper lip via the spring deflection by means of the movement energy of the wind scoop and the wiper blade, the smaller the lever arm becomes via which the movement energy deflects the lip, and the more material is elastically deformed, which produces a favorable transition from a small reaction force to a greater reaction force via a spring deflection that is on the whole large. A favorable transition can also be encouraged through the selection of the contour of the lip, for example by virtue of the fact that it tapers in the direction of the windshield. The small reaction force at the beginning of the spring deflection and the rolling motion prevent an audible impact noise of the wind scoop or lip against the windshield and reduce the pressing force of the wiper lip only slightly and in particular, not abruptly. The wiper blade does not begin to rattle and does not float on the surface. Due to the angled contour, the elastically soft lip has a greater flectional resistance moment in relation to the wind force, by means of which it is less easily blown around and flowed under by the driving wind. As a result of the angled contour, not only do bending moments act on the lip starting from the beginning of the spring deflection, but so do tensile forces counter to the wiping motion, which prevent a vibration of the lip, which could lead to a rattling of the wiper blade.

In windshield wiper systems with two wiper arms, the wind scoop can be attached to each wiper blade or wiper arm or can also be attached in windshield wiper systems with one wiper arm. The most important wiping region is on the driver's side and thus at least one wind scoop is disposed in front of the wiper blade in the downward wiping direction on the driver's side.

According to one embodiment of the invention, the lip is stepped, waved, or zigzagged in the region with which it comes into contact with the windshield. The wind scoop thus contacts the windshield with a smaller area. At the beginning of the spring deflection, less material is deformed by means of the movement energy, the reaction force is reduced, and the impact noise is further reduced. Moreover, the friction force and in particular the adhesion are reduced.

This can be achieved with a lip that is stepped, zigzagged, or waved on the end face, or also with a lip whose material thickness varies in a stepped, zigzagged, or waved fashion in the direction of the wiper lip. Suitably, the zigzags, waves, and/or steps of the lip are embodied with a height of less than 2 mm. At a distance of approx. 0 to 2 mm above the windshield, a flow velocity by means of the driving wind can be rendered virtually negligible. Despite a small contact area, the wind is prevented from flowing under the lip.

In one embodiment of the invention, the wind scoop is elastically connected to the wiper blade or the wiper arm.

The distance of the wind scoop or lip from the windshield is thus adjusted independently of the driving wind. At higher driving speeds and therefore with a stronger driving wind, the wind scoop is pressed closer to the windshield and the wiper blade is prevented from lifting up. At lower driving speeds, the wind scoop can be farther away from the windshield without the wind scoop being lifted. Moreover, the wind scoop is secured against coming into contact with the windshield in an undesirable fashion at low driving speeds. A stop of the elastic support in the direction of the windshield can be selected so that at the maximum speed, the wind scoop comes to rest with the lip close above the windshield and only with the occurrence of additional influence quantities, does the lip of the wind scoop come into contact with the windshield during the downward wiping motion, e.g. with the occurrence of increased friction. However, it is also possible that starting from a certain speed, the lip comes into contact with the windshield during the downward wiping motion.

The lip can be attached to the wind scoop as an additional component. Preferably, however, the wind scoop is a dual component part, with a rigid component and with the elastically soft lip. The number of individual parts is reduced, an assembly step is saved, and the danger of the fastening becoming detached is prevented.

In order to produce the dual component wind scoop, a process is proposed in which at the beginning, the rigid component is cast in a first casting mold. After the material has hardened, material for the lip is injected into a recess in the rigid component and in a second casting mold disposed on the rigid component. After the material has assumed an elastically soft state, the second casting mold is removed. The lip is thus forcibly removed from the mold by virtue of the fact that it is temporarily deflected into a straight form. A reasonably priced one-piece casting mold can be used for the lip. The manufacturing process is comprised of a few separate process steps and is simple and fast. Furthermore, the lip is securely connected to the rigid component. However, the lip can also be separately cast and then threaded into the rigid component.

DRAWINGS

Other advantages ensue from the following description of the drawings. Exemplary embodiments of the invention are shown in the drawings. The drawings, the description, and the claims contain a number of features in combination. One skilled in the art will suitably also consider the features individually and combine them in other logical combinations.

FIG. 1 shows a top view of a wiper blade with a wind scoop,

FIG. 2 shows an enlarged detail of a wiper blade from the side,

Figure 8:
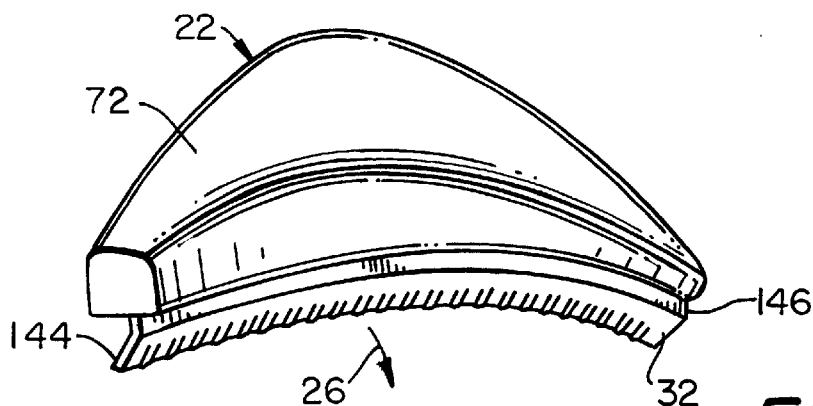
Figure 9:
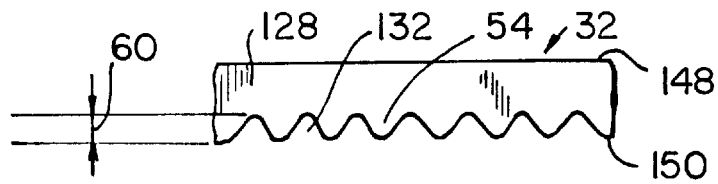
Figure 10:
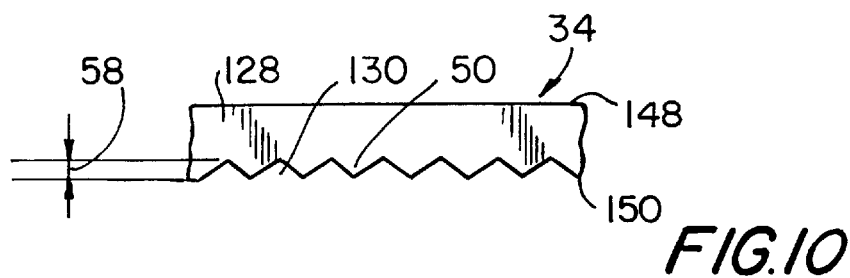
Figure 11:
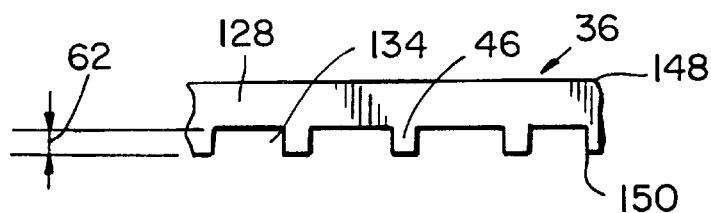
Figure 12:
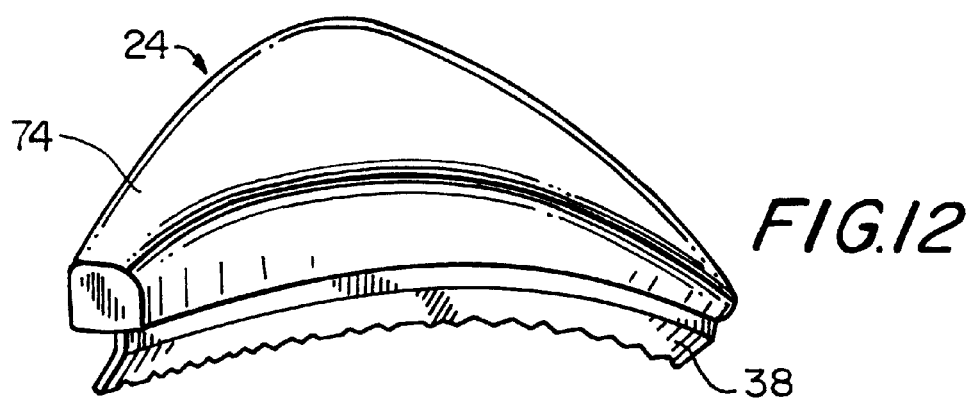
Figure 13:
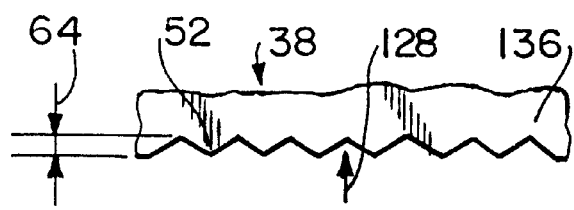
Figure 14:
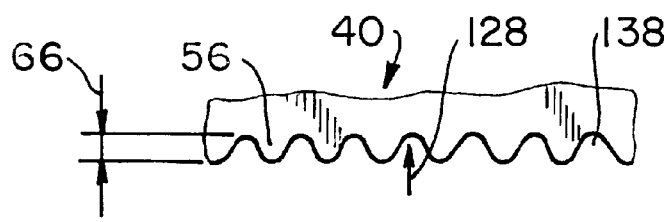
Figure 15:
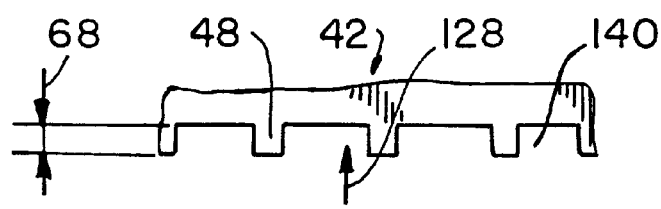
Figure 16:
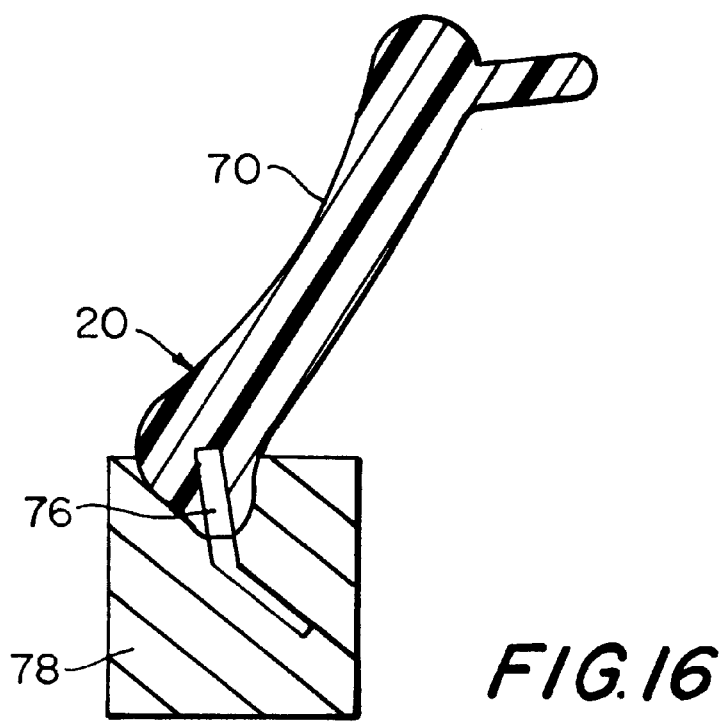
Figure 17:
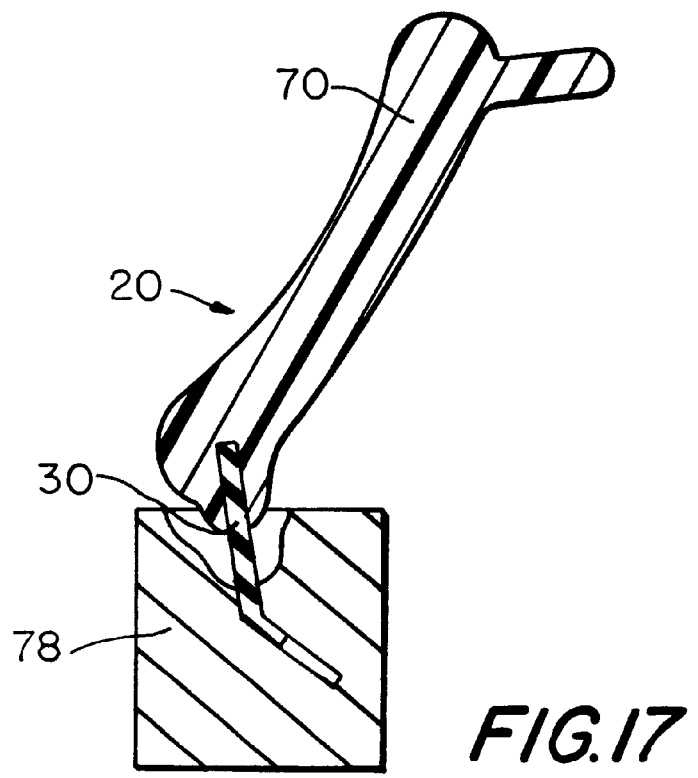

FIG. 4 is a section along the line IV—IV in FIG. 1 in an initial position, FIG. 5 shows a wiper blade according to FIG. 4, immediately after the initial position, FIG. 6 shows a wiper blade according to FIG. 4, shortly before a reversal point, FIG. 7 shows a wiper blade according to FIG. 4, shortly after a reversal point, FIG. 8 shows a three-dimensionally depicted wind scoop, FIG. 9 shows an enlarged view of a lip of the wind scoop according to FIG. 8, from the end face, FIG. 10 shows a variant of the lip according to FIG. 9, with a zigzagged contour, FIG. 11 shows a variant of the lip according to FIG. 9, with a stepped contour, FIG. 12 shows a three-dimensionally depicted wind scoop, FIG. 13 shows an enlarged view of a detail of a lip of the wind scoop according to FIG. 12 from the front, FIG. 14 shows a variant of the lip according to FIG. 13, with a waved contour, FIG. 15 shows a variant of the lip according to FIG. 13, with a stepped contour, FIG. 16 shows a wind scoop with a casting mold for a lip, and FIG. 17 shows a wind scoop according to FIG. 17, in which the casting mold is being removed.

DESCRIPTION OF THE EXEMPLARY EMBODIMENTS

FIG. 1 shows a wiper blade 10 with a wind scoop 20. The wind scoop 20 is elastically supported on the wiper blade 10 by means of fastening elements 80, 82, 84, 86, wherein the position of the wind scoop 20 in relation to the wiper blade 10 and in relation to the windshield 12 (FIGS. 4 to 5) can be adjusted as a function of the intensity of the driving wind 88. The fastening elements 80, 82, 84, 86 can be plugged, glued, and/or welded in place.

The wind scoop 20 extends in the longitudinal direction over nearly the entire length of the wiper blade 10 and thereby covers a support bracket system 90 of the wiper blade 10 (FIG. 2). The wind scoop 20 is curved in accordance with and in the direction 92 of the windshield 12 and as a result has a virtually uniform distance from the windshield 12 in the longitudinal direction.

Figure 3:
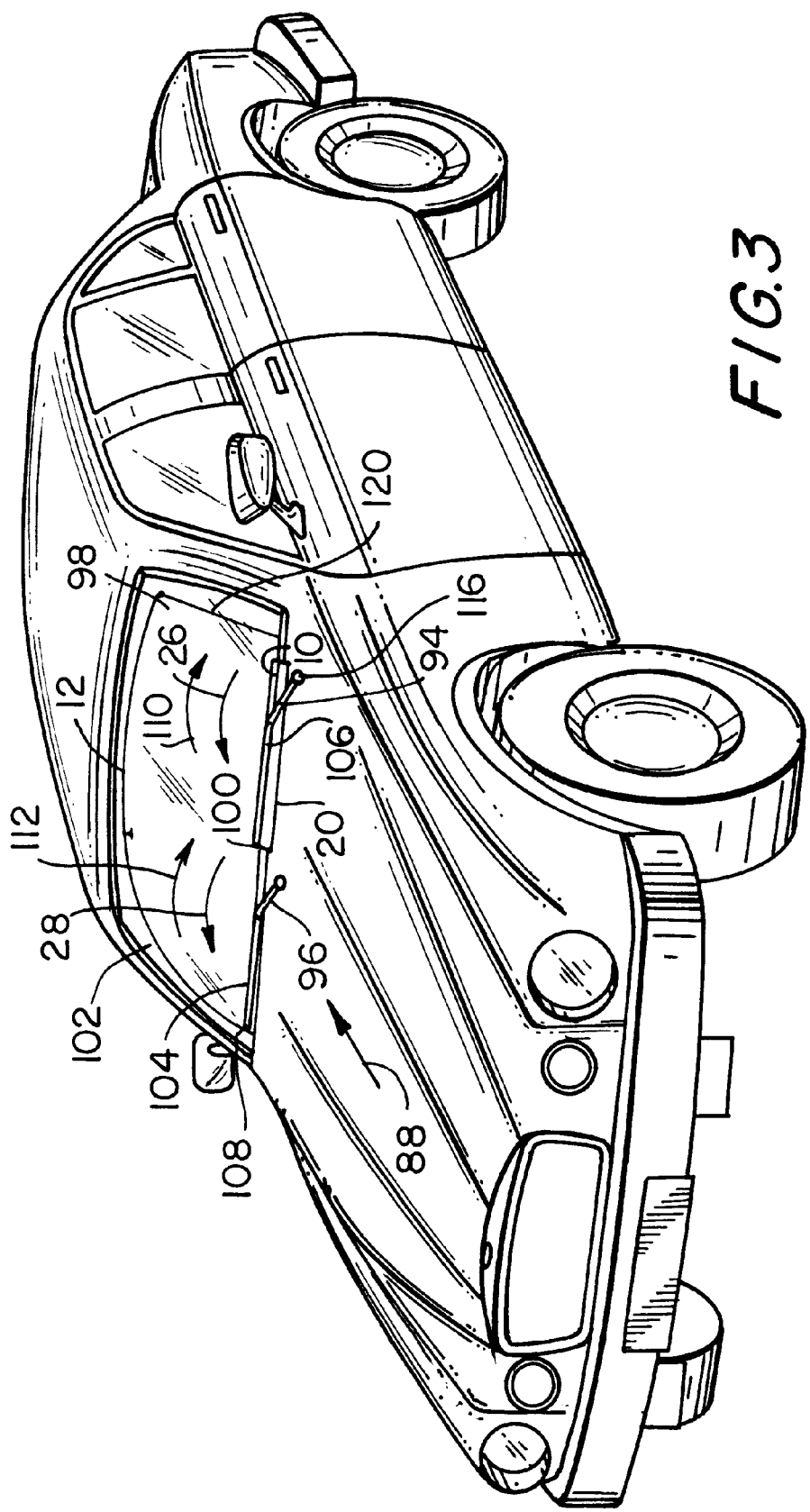
FIG. 3 shows a vehicle.

In a windshield wiper system with two wiper arms 94, 96, the wind scoop 20 is preferably fastened to the wiper blade 10 on both sides or only on the driver's side 98 (FIG. 3). In the windshield wiper system of the vehicle 14 depicted in FIG. 3, the wiper blades 10, 104 are disposed in their parked positions 106, 108 next to each other in the lower region on the windshield 12. The wiper arms 94, 96 do not pivot beyond a perpendicular position or pivot only slightly beyond it and therefore the driving wind 88 only flows against them from one side lateral to their longitudinal span during their downward wiping motions 26, 28 and upward wiping motions 110, 112. The wind scoop 20 is fastened to this side of the wiper blade 10, in front of the wiper blade 10 in the downward wiping direction 26, and presses the wiper blade 10 against the windshield 12 over the entire wiping radius.

It is also possible that a wind scoop is fastened to the wiper blade in a windshield wiper system with one wiper arm. During operation, a one-armed wiper pivots from one side 98 of the windshield 12 via a center position 100 to another side 102 and as a result, the driving wind 88 flows against it evenly from both sides lateral to the longitudinal span. In order to assure that the wiper blade rests securely against the windshield 12 on the driver's side 98, the wind scoop is preferably fastened in front of the wiper blade in the downward wiping direction on the driver's side.

One wiping cycle of the wiper blade 10 with the wind scoop 20 is depicted in FIGS. 4 to 7. The wiper blade 10 rests against the windshield 12 with a rubber wiper element 16 by way of a wiper lip 18. The wind scoop 20 is fastened to the wiper blade 10. This win d scoop is a dual component part with a rigid component 70 made of plastic or sheet metal and an elastically soft lip 30 made of elastomer that is oriented toward the windshield 12 and according to the invention, is angled in the direction 44 of the wiper lip 18.

In FIG. 1, the wiper blade 10 is disposed in the parked position 106 (FIG. 3). The wind scoop 20 is disposed with the lip 30 at a distance 114 above the windshield 12. When the wiper blade 10 is actuated (FIG. 5), the wiper lip 18 tilts over counter to the upward wiping motion 110 at a tilting stem 142. As a result of the curvature of the windshield 12 and the alignment of a drive axle 116 of the wiper arm 94, the inclination of the wiper blade 10 in relation to the windshield 12 changes over the wiping radius in the upward wiping motion 110 so that the wiper blade 10 is inclined in relation to the windshield 12 in the direction of the wind scoop 20 (FIG. 6). The distance 114 of the lip 30 from the windshield 12 is thereby reduced to a distance 118. At a reversal point 120 (FIG. 3), the wiper lip 18 tilts counter to the downward wiping motion 26 (FIG. 7). A friction force 122 between the wiper lip 18 and windshield 12 acts on the wiper blade 10 and tilts it in relation to the windshield 12 further in the direction of the wind scoop 20. Moreover, the wind scoop 20 is moved in opposition to the driving wind 88, by means of which this scoop is pressed further in the direction of the windshield 12. The wind scoop 20 is disposed above the windshield 12 so close to it that with the confluence of different influence quantities in the downward wiping motion, the wind scoop 20 comes into contact with the windshield 12 by way of the lip 30, e.g. with a particularly high friction force 122 and a high wind force resulting from the driving wind 88 and the relative motion of the wiper blade 10. As a result, the movement energy of the tilting motion of the wind scoop 20 and of the wiper blade 10 is compensated for by the lip 30 by virtue of the fact that this lip is deflected counter to the downward wiping motion 26 in the direction of the wiper lip 18 and the movement energy increases as result of an elastic rolling motion. At the beginning, the movement energy acts on the lip 30 by way of a large lever arm 124. The lip 30 produces only a small reaction force 126 against the windshield 12, which prevents an audible impact noise and an abrupt drop in the pressing force of the wiper lip 18 against the windshield 12. As a result, the wiper lip 18 does not float on the surface and the wiper blade is not induced to rattle. Furthermore, like the wiper lip 18, the lip 30 is aligned counter to the downward wiping motion 26. As soon as the lip 30 comes into contact with the windshield 12, tension forces act on it counter to the wiping direction 26, which prevent a vibration of the lip 30 and of the wiper blade 10.

On the way to the parked position 106, the inclination of the wiper blade 10 in relation to the windshield 12 changes so that the wind scoop 20 is lifted up from the windshield 12 once again. Starting from the parked position 106, therefore, the adhesion of the lip 30 to the windshield 12 does not have to be overcome (FIG. 4). During the upward wiping motion 110, with or without an elastic support, the wind scoop 20 always has a certain distance from the windshield 12 and can only come into contact with the windshield 12 when there is a confluence of different influence quantities in the downward wiping direction 26.

The wind scoop 22 shown in FIG. 8 is comprised of a rigid component 72 and an elastically soft lip 32 whose end face is depicted in FIG. 9. The lip 32 has a waved material thickness and in fact has waves 54 in the direction of the downward wiping motion 26. The contact area of the lip 32 against the windshield 12 is low and therefore the friction force and the adhesion are slight. If the lip 32 comes into contact with the windshield 12, less material is also deformed at the beginning, and the reaction force 126 against the windshield 12 and the impact noise are further reduced.

The elastic lip 32 has a first end 144 and a second end 146 as shown in FIG. 8. It also has a first longitudinal edge 148 in continuous contact with the rigid component 72 and a second longitudinal edge 150 provided with the waves 54 as shown in FIG. 9. The waves 54 extend along the entire second longitudinal edge 150 between the first end 144 and the second end 146.

It is also possible to embody lips 34, 36 with zigzags 50 and/or steps 46 (FIGS. 10 and 11). The waves 54, zigzags 50, and steps 46 preferably have a height 58, 60, 62 of less than 2 mm, which renders a flow velocity through the open spaces 130, 132, 134 negligible.

FIG. 12 shows a wind scoop 24 with a rigid component 74 and a lip 38, which is embodied as zigzagged on the end face 128 (FIG. 13). It is also possible to embody lips 40, 42 with waves 56 and/or steps 48 on the end face 128 (FIGS. 14, 15). The zigzags 52, waves 56, and steps 48 have a height 64, 66, 68 of less than 2 mm. A flow velocity through open spaces 136, 138, 140 is negligible.

FIGS. 16 and 17 show how the lip 30 of the wind scoop 20 is produced. A casting mold 78 is attached to the completely cast rigid component 70 in the front region that will later point toward the windshield 12 (FIG. 16). Then material for the lip 30 is injected into a recess 76 in the component 70 and in the casting mold 78. After the material of the lip 30 has assumed an elastically soft state, the casting mold 78 is removed from the component 70 wherein the lip 30 is directed into a straight form counter to its angled contour and is forcibly removed from the mold (FIG. 17). The lip 30 is then securely and firmly connected to the component 70.

REFERENCE NUMERALS

- 10 wiper blade
- 12 windshield
- 14 motor vehicle
- 16 rubber wiper element
- 18 wiper lip
- 20 wind scoop
- 22 wind scoop
- 24 wind scoop
- 26 downward wiping motion
- 28 downward wiping motion
- 30 lip
- 32 lip
- 34 lip
- 36 lip
- 38 lip
- 40 lip
- 42 lip
- 44 direction
- 46 steps
- 48 steps
- 50 zigzags
- 52 zigzags
- 54 waves
- 56 waves
- 58 height
- 60 height
- 62 height
- 64 height
- 66 height
- 68 height
- 70 component
- 72 component
- 74 component
- 76 recess
- 78 casting mold
- 80 fastening element
- 82 fastening element
- 84 fastening element
- 86 fastening element
- 88 driving wind
- 90 support bracket system
- 92 direction
- 94 wiper arm
- 96 wiper arm
- 98 driver's side
- 100 center position
- 102 side
- 104 wiper blade
- 106 parked position
- 108 parked position
- 110 upward wiping motion
- 112 upward wiping motion
- 114 distance
- 116 drive axle
- 118 distance
- 120 reversal point
- 122 friction force
- 124 lever arm
- 126 reaction force
- 128 end face
- 130 free space
- 132 free space
- 134 free space
- 136 free space
- 138 free space
- 140 free space
- 142 tilting stem

I claim:
1. A wiper blade (10) for a windshield of a motor vehicle and a wind scoop (20, 22, 24) fastened to the wiper blade (10) in front of the wiper blade (10) in a downward wiping direction (26) of the wiper (12);
wherein said wiper blade (10) comprises a rubber wiping element (16) having a wiper lip (18), said rubber wiping element (16) is adapted to bear with said wiper lip (18) in contact with the windshield (12), and said wind scoop (20, 22, 24) includes a rigid component (70) and an elastic lip (30, 32, 34, 36, 38, 40, 42), said elastic lip extending from said rigid component in an inclined relationship toward said wiper lip (18) so as to be in close proximity to the windshield (12) during an upward wiping motion of the wiper blade, said elastic lip having a predetermined elasticity and lever arm (124) so that the elastic lip moves closer to the windshield during a downward wiping motion of the wiper blade than during said upward wiping motion and, when opposing forces acting on said wind scoop during said downward wiping motion exceed a predetermined limiting value, the elastic lip contacts the windshield (12) during said downward wiping motion, said opposing forces resulting from action of a driving wind on said wind scoop and friction between the wiper lip and the windshield; and
wherein said elastic lip (30, 32, 34, 36, 38, 40, 42) has a first end (144) and a second end (146) and said elastic lip has a first longitudinal edge (148) held in continuous contact with said rigid component (70) along an entire length of said elastic lip between said first end and said second end and a second longitudinal edge (150) extending along said entire length of said elastic lip opposite to said first longitudinal edge (148), said second longitudinal edge (150) is provided with at least one of a stepped region, a zigzagged region and a waved region extending between said first end and said second end and said elastic lip is formed so that, when said elastic lip comes into contact with the windshield, said at least one of said stepped region, said zigzagged region and said waved region contacts said windshield and friction forces between the elastic lip and the windshield are reduced;

whereby during the downward wiping motion when the elastic lip contacts the windshield an audible impact of the elastic lip on the windshield and a decrease in pressing force of the wiper lip on the windshield are prevented and the wiper blade does not rattle during the downward wiping motion.

2. The wiper blade and wind scoop as defined in claim 1, wherein said stepped region comprises steps (46, 48), said zigzagged region comprises zigzags (50, 52) and said waved region comprises waves (54, 56) and where said steps, zigzags and waves have respective heights smaller than 2 mm.

3. The wiper blade and wind scoop as defined in claim 1, wherein said wind scoop is fastened elastically to the wiper blade.

4. A method of making a wind scoop (20, 22, 24) and wiper blade assembly, said method comprising the steps of:

A) providing a wiper blade,

B) forming a wind scoop through the steps of;
  a) pouring a rigid component material for forming a rigid component (70) into a first casting mold to harden said rigid component material, said first casting mold being formed so that after hardening said rigid component is provided with a recess (76),
  b) after hardening said rigid component provided with said recess (76), disposing a second casting mold (78) on the rigid component in the vicinity of the recess (76) and injecting a lip material for forming an elastic lip (30) into the recess (76) and the second casting mold (78) to form the elastic lip (30) and
  c) after formation of the elastic lip in the recess (76) and the second casting mold (78), forcibly removing the second casting mold (78) from the rigid component (70) to separate the rigid component (70) with the elastic lip (30)

C) attaching the rigid component of the wind scoop to said wiper blade.

* * * * *